(12) United States Patent
Sakamoto (10) Patent No.: US 9,335,489 B2
(45) Date of Patent: May 10, 2016

(54) MANUFACTURING METHOD FOR OPTICAL MODULE

(71) Applicant: FUJIKURA LTD., Tokyo (JP)

(72) Inventor: Shinichi Sakamoto, Sakura (JP)

(73) Assignee: FUJIKURA LTD., Tokyo (JP)

( * ) Notice: Subject to any disclaimer, the term of this patent is extended or adjusted under 35 U.S.C. 154(b) by 179 days.

(21) Appl. No.: 14/051,981

(22) Filed: Oct. 11, 2013

(65) Prior Publication Data

US 2014/0059831 A1  Mar. 6, 2014

Related U.S. Application Data

(63) Continuation of application No. PCT/JP2012/054623, filed on Feb. 24, 2012.

(30) Foreign Application Priority Data

Apr. 13, 2011  (JP) .................................. 2011-089363

(51) Int. Cl.
  *B21D 39/03*  (2006.01)
  *B23P 11/00*  (2006.01)
  *G02B 6/42*   (2006.01)

(52) U.S. Cl.
  CPC ............... *G02B 6/42* (2013.01); *G02B 6/4201* (2013.01); *G02B 6/4203* (2013.01); *G02B 6/424* (2013.01); *G02B 6/4248* (2013.01); *Y10T 29/49826* (2015.01)

(58) Field of Classification Search
  CPC ...... G02B 6/42; G02B 6/4201; G02B 6/4219; G02B 6/424; G02B 6/4401; G02B 6/46; Y10T 29/49131; Y10T 29/49826
  USPC ............. 29/428, 464, 592.1, 594, 609.1, 833
  See application file for complete search history.

(56) References Cited

U.S. PATENT DOCUMENTS

| | | | | |
|---|---|---|---|---|
| 5,071,248 A | * | 12/1991 | Tiefenthaler et al. | 356/128 |
| 5,120,131 A | * | 6/1992 | Lukosz | 356/481 |
| 5,442,169 A | * | 8/1995 | Kunz | 250/227.21 |
| 5,623,561 A | * | 4/1997 | Hartman | 385/12 |
| 5,754,714 A | * | 5/1998 | Suzuki et al. | 385/5 |

(Continued)

FOREIGN PATENT DOCUMENTS

| | | |
|---|---|---|
| CN | 1350650 A | 5/2002 |
| CN | 1938622 A | 3/2007 |

(Continued)

OTHER PUBLICATIONS

Office Action dated Nov. 4, 2014, issued in corresponding Chinese Patent Application No. 201280014382.2 (7 pages).

(Continued)

*Primary Examiner* — Paul D Kim
(74) *Attorney, Agent, or Firm* — Westerman, Hattori, Daniels & Adrian, LLP (57) ABSTRACT

A method of manufacturing an optical module 1 in which an optical fiber 10 is fixed to two fixing portions (a fiber mount 30 and a pipe part 51) includes a first fixing step P3 of fixing apart of the optical fiber 10 to the fiber mount 30, and a second fixing step P4 of applying tension by pulling the optical fiber 10 while a base 20 connected to the respective fixing portions has been heated to an upper limit or higher of guaranteed temperature of the optical module 1 and fixing the other part of the optical fiber 10 to the pipe part 51.

4 Claims, 5 Drawing Sheets

(56) References Cited

U.S. PATENT DOCUMENTS

| | | | |
|---|---|---|---|
| 7,421,200 B2 * | 9/2008 | Liu et al. | 398/45 |
| 7,433,045 B2 * | 10/2008 | Ronnekleiv et al. | 356/478 |
| 7,826,122 B2 * | 11/2010 | Morishita | 359/239 |
| 8,213,481 B2 * | 7/2012 | Miyokawa | 372/107 |
| 8,687,663 B2 * | 4/2014 | Sakamoto et al. | 372/34 |
| 2003/0091301 A1 * | 5/2003 | Lee et al. | 385/89 |
| 2004/0005120 A1 * | 1/2004 | Takeda et al. | 385/60 |
| 2006/0045809 A1 * | 3/2006 | Shirai et al. | 422/82.11 |
| 2007/0077013 A1 | 4/2007 | Nakagawa et al. | |
| 2007/0171514 A1 * | 7/2007 | Rong et al. | 359/326 |
| 2008/0102544 A1 | 5/2008 | Okada et al. | |
| 2011/0142082 A1 * | 6/2011 | Jeon et al. | 372/6 |

FOREIGN PATENT DOCUMENTS

| | | |
|---|---|---|
| CN | 101170895 A | 4/2008 |
| EP | 1178336 A1 | 2/2002 |
| JP | 02-073207 A | 3/1990 |
| JP | 04-152308 A | 5/1992 |
| JP | 11-174261 A | 7/1999 |
| WO | 00/10045 A1 | 2/2000 |

OTHER PUBLICATIONS

International Search Report dated Mar. 19, 2012, issued in corresponding application No. PCT/JP2012/054623.

* cited by examiner

MANUFACTURING METHOD FOR OPTICAL MODULE

CROSS-REFERENCE TO RELATED APPLICATION

This application is based on and claims priority of PCT International Application No. PCT/JP2012/054623, filed on Feb. 24, 2012, the entire contents of which are incorporated herein by reference.

TECHNICAL FIELD

The present invention relates to a method of manufacturing an optical module, and more particularly, to a method of manufacturing an optical module that has excellent reliability.

BACKGROUND ART

An optical module that inputs a laser beam output from a semiconductor laser element to a core of an optical fiber is known. In this optical module, generally, a semiconductor laser element is disposed in a sealed housing, relative positions of the semiconductor laser element and end portions of the optical fiber exactly correspond to each other, and the optical fiber is fixed on a fiber mount provided in the housing. Since the optical fiber is guided to the outside of the housing, the optical fiber is usually also fixed to the housing other than the fiber mount.

Patent Document 1 discloses such an optical module. In this optical module, the tip of the optical fiber is fixed on the fiber mount in the housing, a part of the optical fiber is fixed in a through hole of a pipe part that is a part of the housing, and the optical fiber is guided to the outside of the housing from the inside of the housing. In this optical module, the central axis of the pipe part and the upper surface of the fiber mount are disposed not to be flush with each other. For this reason, the optical fiber is bent between a portion of the optical fiber, which is fixed to the pipe part, and the tip of the optical fiber.

CITATION LIST

Patent Document

[Patent Document 1] International Publication No. WO 2000/10045

SUMMARY OF THE INVENTION

Objects to be Achieved by the Invention

In the optical module disclosed in Patent Document 1, the amount of bending of the optical fiber is determined according to a difference in level between the central axis of the pipe part and the upper surface of the fiber mount. However, in this optical module, there is a possibility that the optical fiber is bent more than necessary in the housing. When the optical fiber is bent more than necessary as described above, small cracks or the like are generated in the optical fiber due to the use for a long time. For this reason, the reliability of the optical module may deteriorate. Further, if the amount of bending of the optical fiber in the housing is excessively small, the base on which the fiber mount is disposed is thermally expanded when the temperature of the optical module becomes high. Accordingly, a distance between the fiber mount and the pipe part is increased, so that tensile stress is applied to the optical fiber. For this reason, there is a concern that the optical fiber is broken.

Accordingly, an object of the invention is to provide a method of manufacturing an optical module that has excellent reliability.

Means for Achieving the Objects

The present invention is a method of manufacturing an optical module in which an optical fiber is fixed to two fixing portions, the method including: a first fixing step of fixing a part of the optical fiber to one fixing portion; and a second fixing step of applying tension by pulling the optical fiber while a base connected to the respective fixing portions has been heated to an upper limit or higher of guaranteed temperature of the optical module, and fixing the other part of the optical fiber to the other fixing portion, wherein when $t_{max}$ denotes the upper limit of the guaranteed temperature, $t_{base}$ denotes the temperature of the base heated in the second fixing step, $k_1$ denotes an equivalent linear coefficient of expansion of the base, $k_2$ denotes a linear coefficient of expansion of the optical fiber, A denotes the cross-sectional area of the optical fiber, E denotes the Young's modulus of the optical fiber, and F denotes the tension, $$0 < F < A \times E \times (k_1 - k_2) \times (t_{base} - t_{max})$$

is satisfied.

In the optical module, the temperature of the base may be changed in the guaranteed temperature range of the optical module by environmental temperature at the time of the keeping of the optical module or heat generated at the time of the operation of the optical module, and the base may be thermally expanded and contracted. In the optical module using the optical fiber, the thermal coefficient of expansion of the base is higher than the thermal coefficient of expansion of the optical fiber. However, in the method of manufacturing the optical module according to the invention, a part of the optical fiber is fixed to one fixing portion and positive tension, which satisfies the condition, is applied to the optical fiber so that the optical fiber is made linear. Accordingly, it is possible to prevent excessive bending stress, which is caused by unexpected bending of the optical fiber, from being applied to the optical fiber. In addition, while the base has been heated to the upper limit or higher of the guaranteed temperature of the optical module and the base has been thermally expanded, the other part of the optical fiber is fixed to the other fixing portion. Accordingly, since compressive stress is always applied to the optical fiber in the guaranteed temperature range, the manufactured optical module can prevent tensile stress, which causes the breaking of the optical fiber, from being applied to the optical fiber. The optical fiber may be bent by this compressive stress, but the amount of bending of the optical fiber can be made small so as not to reach the amount based on the thermal contraction of the base. Accordingly, it is possible to prevent the optical fiber from being bent more than necessary. Since the optical module, which is manufactured by the method of manufacturing the optical module of the invention as described above, can prevent the optical fiber from being broken or prevent cracks from being generated in the optical fiber, the optical module can have excellent reliability.

Meanwhile, in this specification, the "guaranteed temperature" means temperature at which the operation of the optical module is guaranteed when the optical module is kept or used, and "applying tension" means linearly stretching the optical fiber.

Further, in the method of manufacturing the optical module, the first fixing step and at least a part of the second fixing step may be simultaneously performed.

Further, in the method of manufacturing the optical module, one fixing portion may be a fiber mount and the other fixing portion may be a part of a housing.

According to the method of manufacturing the optical module, it is possible to manufacture the optical module in which one end portion of the optical fiber is fixed to the fiber mount provided in the housing and the optical fiber is guided to the outside of the housing from the inside of the housing.

Further, in the method of manufacturing the optical module, it is preferable that the optical fiber is pulled in the second fixing step so that tension is not applied to the optical fiber when the base is heated to a temperature higher than the upper limit of the guaranteed temperature and the temperature of the base becomes the same temperature as the upper limit of the guaranteed temperature.

According to the method of manufacturing the optical fiber, it is possible to prevent tension from being applied to the optical fiber within the guaranteed temperature of the optical module and to make reliability more excellent.

Effect of the Invention

As described above, according to the invention, there is provided a method of manufacturing an optical module that has excellent reliability.

DESCRIPTION OF THE EMBODIMENTS

Preferred embodiments of a method of manufacturing an optical module according to the invention will be described in detail below with reference to the drawings.

First Embodiment

Figure 1:
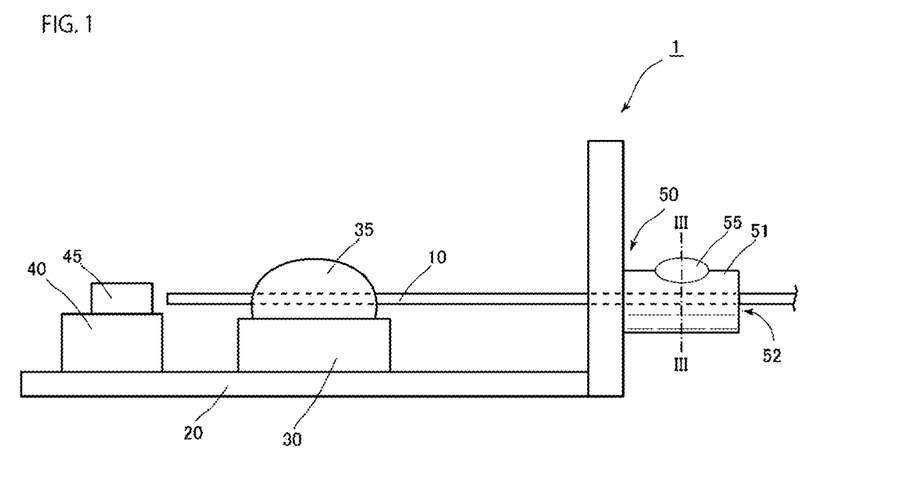
FIG. 1 is a diagram illustrating an optical module according to a first embodiment of the invention.

FIG. 1 is a diagram illustrating an optical module according to a first embodiment of the invention.

As illustrated in FIG. 1, an optical module 1 includes a base 20, a fiber mount 30 and a laser mount 40 that are disposed on the base 20, a semiconductor laser element 45 that is disposed on the laser mount 40, a optical fiber 10 of which a part is fixed on the fiber mount 30, and a housing 50 that is connected to the base 20 and fixes the other part of the optical fiber, as main components. As described above, the optical module 1 of this embodiment is an optical module in which the optical fiber 10 is fixed to two fixing portions (a part of the fiber mount 30 and the housing 50), and is an optical module that outputs a laser beam, which is output from the semiconductor laser element 45, to the outside of the housing 50 by the optical fiber 10. Meanwhile, only a part of the housing 50 is illustrated in FIG. 1.

The housing 50 has a structure in which a pipe part 51 is connected to a substantially rectangular parallelepiped outer frame, and the base 20 forms a part (bottom) of the housing 50. A through hole 52 formed in the pipe part 51 connects spatially the inside of the housing 50 with the outside of the housing 50. Further, the housing 50 is adapted so that the outer frame is opened by a mechanism (not illustrated) and the inside of the housing is exposed to the outside. A portion of the housing 50, which is connected to the pipe part 51, is not particularly limited, but may be formed by machining a plate made of, for example, stainless steel, an aluminum alloy, or the like.

The base 20 is formed of a plate-like member that is made of, for example, metal or ceramic. When the material of the base 20 is metal, this metal is not particularly limited but examples of this metal may include copper and copper tungsten. When the material of the base 20 is ceramic, this ceramic is not particularly limited but examples of this ceramic may include aluminum nitride (AlN) and alumina ($Al_2O_3$). Meanwhile, the linear coefficient of expansion of quartz, which forms the optical fiber 10, is about $0.51 \times 10^{-6}(1/° C.)$, but the linear coefficient of expansion of the material of the base 20 is larger than $0.51 \times 10^{-6}(1/° C.)$. Specifically, the linear coefficient of expansion of copper is $16.8 \times 10^{-6}(1/° C.)$, the linear coefficient of expansion of copper tungsten (W90%) is $6.5 \times 10^{-6}(1/° C.)$, the linear coefficient of expansion of AlN is $4.5 \times 10^{-6}(1/° C.)$, and the linear coefficient of expansion of $Al_2O_3$ is $7.0 \times 10^{-6}(1/° C.)$.

The laser mount 40 disposed on the base 20 has a substantially rectangular parallelepiped shape, and is fixed on the base 20 by a solder material (not illustrated). The material of the laser mount 40 is not particularly limited, but examples of the material of the laser mount 40 may include ceramic, such as AlN and $Al_2O_3$. AlN is preferable among them in terms of excellent thermal conductivity. Further, when the base 20 and the laser mount 40 are made of the same ceramic, the base 20 and the laser mount 40 may be integrally molded.

The semiconductor laser element 45 is fixed on the laser mount 40 by a solder material (not illustrated). A plurality of semiconductor layers are laminated in the semiconductor laser element 45, and these semiconductor layers form a resonator structure. Moreover, a laser beam having a wavelength of, for example, 900 nm is output from the surface of the semiconductor laser element 45 facing the optical fiber.

The fiber mount 30 disposed on the base 20 has a substantially rectangular parallelepiped shape, and is fixed on the base 20 in the same manner as the laser mount. The material of the fiber mount 30 is not particularly limited, but examples of the material of the fiber mount 30 may include the same material as the material of the laser mount 40. AlN is preferable among them in terms of excellent thermal conductivity. Further, when the base 20 and the fiber mount 30 are made of the same ceramic, the base 20 and the fiber mount 30 may be integrally molded. Furthermore, an ultraviolet curable resin 35 as a fixing member is fixed on the surface of the fiber mount 30 opposite to the base 20.

Figure 2:
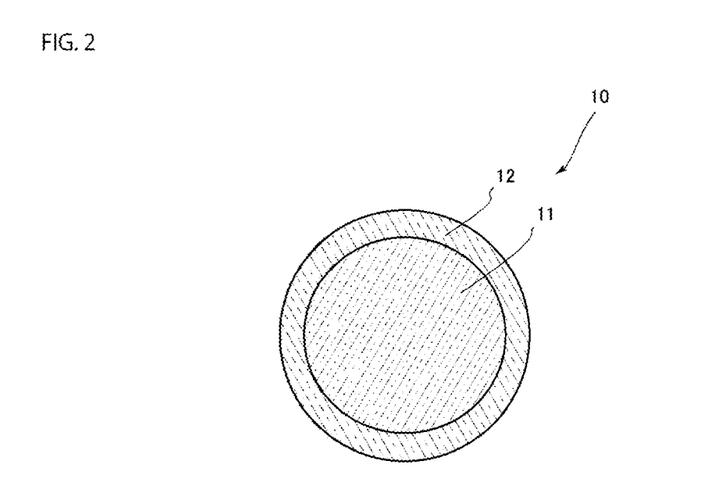
FIG. 2 is a diagram illustrating the structure of the cross-section of an optical fiber of the optical module perpendicular to the longitudinal direction of the optical fiber.

FIG. 2 is a diagram illustrating the structure of the cross-section of the optical fiber perpendicular to the longitudinal direction of the optical fiber 10 of the optical module 1. As illustrated in FIG. 2, the optical fiber 10 includes a core 11 and a clad 12 surrounding the outer peripheral surface of the core 11. The refractive index of the clad 12 is lower than the refractive index of the core 11, the core 11 is made of, for example, glass to which a dopant increasing a refractive index such as germanium has been added, and the clad 12 is made of, for example, pure quartz to which any dopant does not have been added. Further, although not particularly illustrated, the clad 12 is covered with a covering layer, which is made of an ultraviolet curable resin or the like, outside the optical module 1.

The optical fiber 10 passes through the ultraviolet curable resin 35, and a part of the optical fiber 10 near the tip of the optical fiber 10 is fixed to the ultraviolet curable resin 35. Further, the end face of the optical fiber 10 faces the light emitting surface of the semiconductor laser element 45, and a laser beam output from the semiconductor laser element 45 is input to the core 11.

Figure 3:
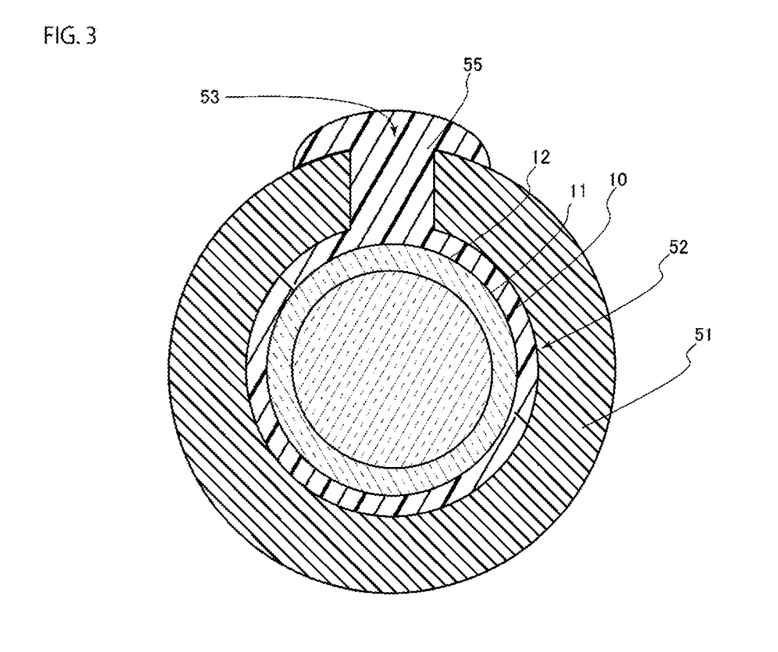
FIG. 3 is a diagram illustrating the structure of the cross-section taken along line III-III of FIG. 1.

FIG. 3 is a diagram illustrating the structure of the cross-section taken along line III-III of FIG. 1. As illustrated in FIGS. 1 and 3, the optical fiber 10 passes through the through hole 52 of the pipe part 51 of the housing 50 and is guided to the outside of the housing 50 from the inside of the housing 50. Furthermore, a hole 53 is formed in the pipe part 51 in a direction perpendicular to the through hole 52, and an ultraviolet curable resin 55 is filled through the hole 53. Moreover, the optical fiber 10 is covered with the ultraviolet curable resin 55 in the through hole 52, so that the optical fiber 10 is fixed in the through hole 52.

In this way, the optical fiber 10 is fixed to the fiber mount 30 and the pipe part 51 that is a part of the housing 50.

When electric power is supplied to the optical module 1 from the outside (not illustrated), a laser beam is output from the semiconductor laser element 45. The output laser beam is input to the core 11 of the optical fiber 10, is propagated through the core 11, and is output to the outside of the optical module 1.

Further, a predetermined guaranteed temperature range is set for the optical module 1. The optical module 1 is kept at an environmental temperature that is equal to or lower than an upper limit of the guaranteed temperature, and is used at a temperature that is not higher than the upper limit of the guaranteed temperature. The upper limit of the guaranteed temperature of the optical module 1 is set to, for example, 85° C. according to the characteristics of the semiconductor laser element 45 in which the dependency of the laser output on the temperature is large. Meanwhile, a lower limit of the guaranteed temperature of the optical module 1 is set to, for example, −20° C.

Next, a method of manufacturing the optical module 1 will be described.

Figure 4:
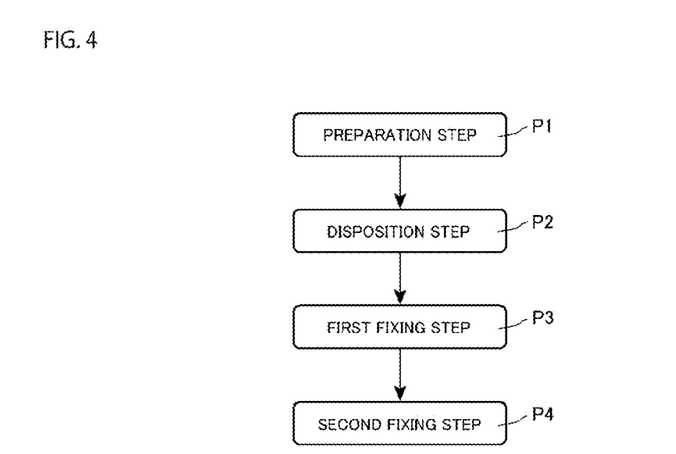
FIG. 4 is a flowchart illustrating steps of a method of manufacturing the optical module of FIG. 1.

FIG. 4 is a flowchart illustrating steps of a method of manufacturing the optical module 1 of FIG. 1. As illustrated in FIG. 4, the method of manufacturing the optical module 1 includes a preparation step P1 of preparing the optical fiber 10 and a semi-finished optical module to which the optical fiber 10 is not connected, a disposition step P2 of disposing an end portion of the optical fiber 10 in the housing 50 through the through hole 52 of the pipe part 51, a first fixing step P3 of fixing a part of the optical fiber 10 near the tip of the optical fiber 10 on the fiber mount 30, and a second fixing step P4 of fixing the other part of the optical fiber 10 in the through hole 52 of the pipe part 51.

(Preparation Step P1)

First, the optical fiber 10 is prepared. The diameter of the clad of the optical fiber is 125 μm. When the optical fiber 10 is covered with a covering layer, the covering layer of at least a portion of the optical fiber inserted into the housing 50 is peeled off. In addition, a semi-finished optical module to which the optical fiber 10 is not connected is prepared. When the inside of the housing 50 is not exposed to the outside in the semi-finished optical module, the housing 50 is opened in order to perform the subsequent steps and the fiber mount 30 and the like provided in the housing 50 are exposed to the outside. The base 20 of the housing 50 is made of, for example, copper.

(Disposition Step P2)

Next, the tip of the optical fiber 10 is inserted into the housing 50 through the through hole 52 of the pipe part 51. Further, the optical fiber 10 is accurately positioned and disposed so that the end face of the optical fiber 10 and the light emitting surface of the semiconductor laser element 45 face each other and a laser beam output from the semiconductor laser element 45 is input to the core 11 of the optical fiber 10. In this case, a part of the optical fiber 10 is disposed on the fiber mount 30 and the other part of the optical fiber 10 is disposed in the through hole 52 of the pipe part 51.

(First Fixing Step P3)

Next, a part of the optical fiber 10, which is disposed on the fiber mount 30, is fixed on the fiber mount 30. Specifically, while a part of the optical fiber 10 has been disposed on the fiber mount 30 in the disposition step P2, an ultraviolet curable resin, which is a precursor of the ultraviolet curable resin 35, is applied so as to connect the optical fiber 10 with the upper surface of the fiber mount 30.

Figure 5:
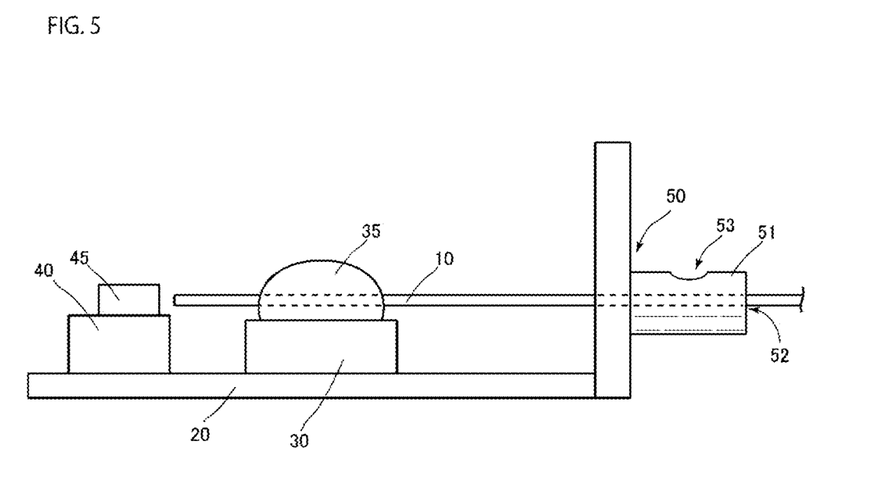
FIG. 5 is a diagram illustrating an aspect in which a first fixing step has been performed.

After that, the ultraviolet curable resin is irradiated with ultraviolet light so that the ultraviolet curable resin is cured. In this way, a part of the optical fiber 10 is fixed to the fiber mount 30 by the ultraviolet curable resin 35 as illustrated in FIG. 5.

(Second Fixing Step P4)

Figure 6:
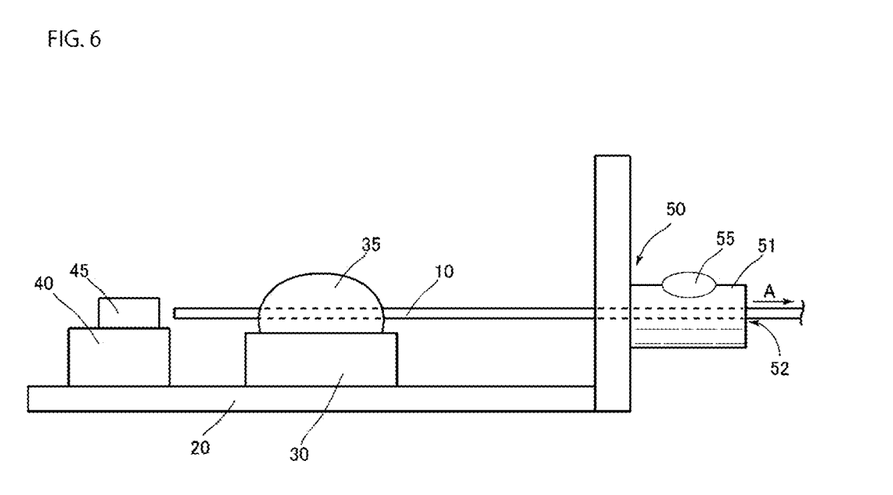
FIG. 6 is a diagram illustrating an aspect of a second fixing step.

FIG. 6 is a diagram illustrating an aspect of the second fixing step P4. As illustrated in FIG. 6, the base 20 is heated by a heater 61 in the second fixing step P4. In this case, the temperature of the base 20 is set to be $t_{base}$ that is equal to or higher than the upper limit of the guaranteed temperature of the optical module 1. In this way, the base 20 is expanded to a size, which is equal to or larger than the size corresponding to the upper limit of the guaranteed temperature, by the heat of the heater 61. The temperature of the base 20, which is caused by the heater 61 in this case, is equal to or higher than the upper limit of the guaranteed temperature of the optical module 1. As long as the temperature of the base 20 is a temperature that does not affect a solder material or the like used to fix the semiconductor laser element 45, the temperature of the base 20 is not particularly limited. For example, when the upper limit of the guaranteed temperature is set to 85° C. as described above, the temperature of the base 20 is in the range of 100 to 150° C. Since the base 20 is heated by the heater 61 as described above, it is possible to freely control the temperature of the base 20 by controlling the set temperature of the heater 61.

Further, while the base 20 is expanded by heat, the optical fiber 10 is pulled in the direction illustrated by an arrow A of FIG. 6 so that tension F is applied to the optical fiber 10. Since tension is applied to the optical fiber 10 as described above, the optical fiber 10 is linearly stretched without being bent. Since the optical fiber 10 is linearly stretched without being bent as described above, it is possible to prevent excessive bending stress, which is caused by unexpected bending, from being applied to the optical fiber 10.

Figure 7:
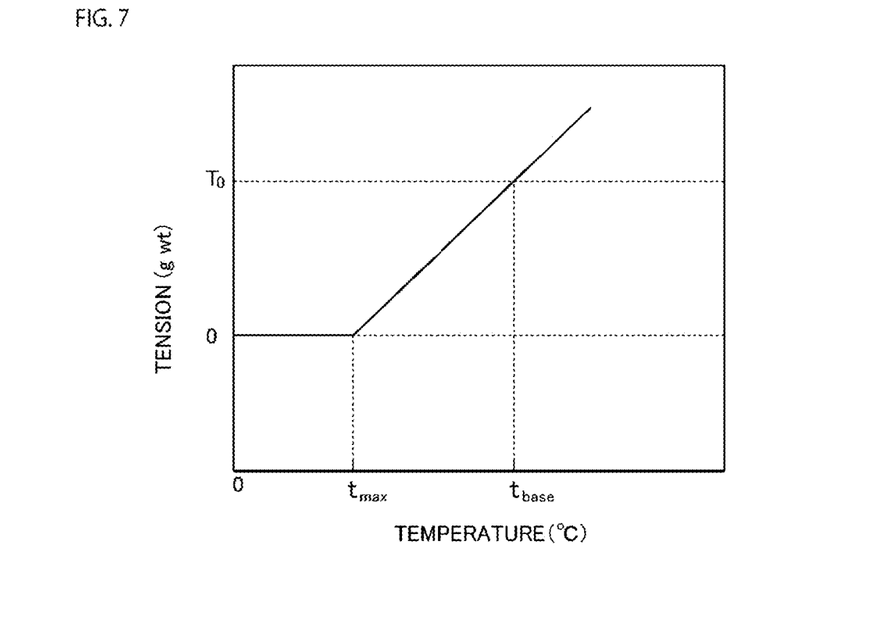
FIG. 7 is a diagram illustrating a relationship between the temperature of a base and tension to be applied to the optical fiber.

Tension $T_0$, which is set so that the tension of the optical fiber 10 is 0 or less when the temperature of the base 20 is changed to the upper limit $t_{max}$ of the guaranteed temperature from $t_{base}$, is obtained from the linear coefficient of expansion of the base 20 and the linear coefficient of expansion of the optical fiber 20, and the optical fiber 10 is fixed in the through hole 52 of the pipe part 51 as described below while the optical fiber 10 is pulled by the tension $T_0$. FIG. 7 illustrates a relationship between the temperature of the base 20 and the tension of the optical fiber 10 when the optical fiber 10 is fixed as described above. In FIG. 7, tension is represented by 0 at a temperature that is equal to or lower than temperature $t_{max}$, but this is a state in which compressive stress is applied to the optical fiber 10 or the optical fiber 10 is bent by compressive stress. That is, it is understood that compressive stress is applied to the optical fiber 10 and tensile stress is prevented from being applied to the optical fiber 10 in the entire guaranteed temperature range by performing the second fixing step in the above-mentioned condition.

Since the linear coefficient of expansion of the optical fiber 10 and the linear coefficient of expansion of the base 20 are known in advance, the temperature $t_{base}$ and the tension F at the time of fixing are set from the amount of bending of the optical fiber 10 that is allowable at the lower limit of the guaranteed temperature, the temperature $t_{base}$ of the second fixing step, and the tension of the optical fiber 10 that is allowable at this temperature. Even though the temperature of the optical module 1, that is, the temperature of the base 20 is changed in the entire guaranteed temperature range by performing the second fixing step in the condition that is set as described above, it is possible to prevent tensile stress, which causes the breaking of the optical fiber 10, from being applied to the optical fiber 10. Further, even when the fiber is bent, it is possible to prevent the occurrence of bending causing cracks or the like in the fiber so that the amount of bending of the optical fiber does not reach the amount based on the thermal contraction of the base known in advance. For example, in this embodiment, the tension F applied to the optical fiber is in the range of, for example, 100 g wt to 200 g wt.

For example, if the tension F applied to the fiber is set to satisfy $$0 < F < A \times E \times (k_1 - k_2) \times (t_{base} - t_{max})$$

(where, $k_1$ denotes the equivalent linear coefficient of expansion of the base 20, $k_2$ denotes the linear coefficient of expansion of the optical fiber 10, $t_{base}$ denotes fixing temperature, $t_{max}$ denotes the upper limit of the guaranteed temperature, A denotes the cross-sectional area of the fiber, and E denotes the Young's modulus of the fiber), it is possible to prevent tension from being applied to the optical fiber 10 in the entire guaranteed temperature range and to calculate the amount of bending, which is caused by compressive stress, in advance. Accordingly, it is possible to prevent bending from exceeding an allowable limit in the entire guaranteed temperature range. Meanwhile, it is possible to achieve the relationship between the temperature of the base 20 and the tension of the optical fiber 10 illustrated in FIG. 7 by setting $$F = T_0 A \times E \times (k_1 - k_2) \times (t_{base} - t_{max})$$

Meanwhile, the tension of the optical fiber 10 may also be affected from the housing 50 except for the base 20 in a certain structure of the housing 50. In this meaning, $k_1$ denotes the equivalent linear coefficient of expansion of the base 20 including contribution from the housing 50 except for the base 20.

Since the optical fiber 10 is pulled by the predetermined tension described above and fixing work is performed in the second fixing step, it is possible to accurately manage tension as compared to a case in which the optical fiber 10 is merely placed on a part of the fiber mount or the housing and tension is not applied at all. Since it is possible to accurately set tension at the time of the fixing of the optical fiber 10 as described above, it is possible to make stress, which is applied to the optical fiber 10, be in a predetermined range without deviation within the guaranteed temperature range of the optical module 1. Accordingly, it is possible to improve the reliability of the optical module 1.

Next, while the tension F is applied to the optical fiber 10, the optical fiber 10 is fixed in the through hole 52 of the pipe part 51. Specifically, an ultraviolet curable resin, which is a precursor of the ultraviolet curable resin 55, is filled into the through hole 52 through the hole 53 formed in the pipe part 51. Since the optical fiber 10 has been already inserted into the through hole 52 at this time, the optical fiber 10 inserted into the through hole 52 is covered with the filled ultraviolet curable resin. Further, the inside of the through hole of the pipe part 51 is irradiated with ultraviolet light, so that the ultraviolet curable resin is cured. Accordingly, the optical fiber 10 is fixed in the through hole 52 of the pipe part 51 as illustrated in FIG. 3. Collimated UV light may enter the through hole of the pipe part in the direction parallel to the pipe so that the irradiation of ultraviolet light is performed. Meanwhile, tension may be applied to the optical fiber 10 after the through hole 52 of the pipe part 51 is filled with an ultraviolet curable resin.

Moreover, after the ultraviolet curable resin 55 is cured, the optical module 1 is separated from the heater so that the temperature of the optical module 1 is gradually lowered. Further, the housing 50 is closed as necessary, and the housing 50 is hermetically sealed. Meanwhile, the housing 50 may be closed between the first fixing step P3 and the second fixing step P4.

The optical module 1 illustrated in FIG. 1 is obtained in this way.

As described above, in the optical module, the temperature of the base 20 may be changed in the guaranteed temperature range of the optical module 1 by environmental temperature at the time of the keeping of the optical module or heat generated at the time of the operation of the optical module, and the base 20 may be thermally expanded. However, in the method of manufacturing the optical module 1 according to the invention, a part of the optical fiber 10 is fixed to the fiber mount 30 and the base 20 is heated to an upper limit or higher of the guaranteed temperature of the optical module 1 so that the base 20 is thermally expanded. Further, since the optical fiber 10 is fixed in the through hole 52 of the pipe part 51 while tension has been applied to the optical fiber 10, the manufactured optical module 1 can prevent tension, which causes the breaking of the optical fiber 10, from being applied to the optical fiber 10 even though the temperature of the base 20 is changed in the guaranteed temperature range. Further, when the temperature of the optical module 1 is low, the optical fiber 10 may be bent but the amount of bending of the optical fiber 10 can be reduced so that the amount of bending of the optical fiber does not reach the amount based on the thermal contraction of the base 20. Accordingly, it is possible to prevent the optical fiber 10 from being further bent more than necessary. Since the optical module 1, which is manufactured by the method of manufacturing the optical module 1 of this embodiment as described above, can prevent the optical fiber 10 from being broken or prevent cracks from being generated in the optical fiber 10, the optical module 1 can have excellent reliability.

Meanwhile, the second fixing step P4 has been performed after the first fixing step P3 in the above-mentioned embodiment, but the first fixing step P3 and at least a part of the second fixing step P4 may be simultaneously performed.

Second Embodiment

Figure 8:
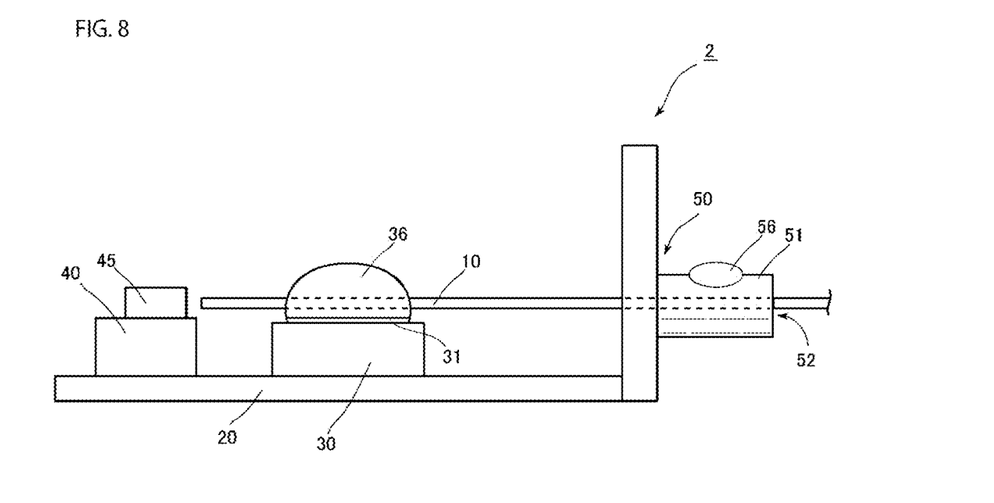
FIG. 8 is a diagram illustrating an optical module according to a second embodiment of the invention.

Next, a second embodiment of the invention will be described in detail with reference to FIG. 8. Meanwhile, the same components as the components of the first embodiment or components equivalent to the components of the first embodiment will be denoted by the same reference numerals except when being particularly described, and the repeated description thereof will be omitted. FIG. 8 is a plan view illustrating an optical module 2 according to a second embodiment of the invention.

As illustrated in FIG. 8, the optical module 2 of this embodiment is different from the optical module 1 of the first embodiment in that a part of an optical fiber 1 is fixed on a fiber mount 30 by solder 36 and the other part thereof is fixed in a through hole 52 of a pipe part 51 by solder 56.

For this reason, a bonding pad 31 is formed on the surface of the fiber mount 30 opposite to the base 20. As long as the bonding pad 31 is made of a material to which the solder 36 can be fixed, the bonding pad 31 is not particularly limited. However, in this embodiment, a titanium (Ti) layer is laminated so as to face the fiber mount 30, a platinum (Pt) layer is laminated on the Ti layer, a gold (Au) layer is laminated on the Pt layer, and the surface of the Au layer forms the surface of the bonding pad 31 opposite to the fiber mount 30. Further, the solder 36 is fixed on the bonding pad 31, and covers the optical fiber 10 provided on the bonding pad 31. In this way, the optical fiber 10 is fixed on the fiber mount by the solder 36.

Furthermore, the solder 56 is filled into the through hole 52 of the pipe part 51, into which the optical fiber 10 is inserted, through a hole 53 of the pipe part 51, so that the optical fiber 10 is covered with the solder 56 in the through hole 52 and is fixed in the through hole 52.

Examples of the solders 36 and 56 may include gold-tin eutectic solder, and examples of a ratio between Au and tin (Sn) may include Au80%-Sn20% and Au10%-Sn90%. When the solder 36 corresponds to Au80%-Sn20%, the melting point of the solder 36 is about 280° C.

Meanwhile, the optical fiber 10 is covered with a metallized layer (not illustrated) on the bonding pad 31 and in the through hole 52, and the metallized layer is fixed to the solders 36 and 56. This metallized layer is adapted to easily get wet by the solders 36 and 56 and to easily be fixed. Although not particularly limited, the metallized layer is formed of, for example, a laminate including a Ni layer and an Au layer, the Ni layer covers the outer peripheral surface of a clad 12, and the Au layer covers the outer peripheral surface of the Ni layer. Further, the thicknesses of the Ni layer and the Au layer are not particularly limited. However, the thickness of the Ni layer is in the range of 2 μm to 3 μm, and the thickness of the Au layer is in the range of 0.1 μm to 0.2 μm. It is preferable that the surface of the metallized layer be formed of an Au layer since the solder wettability of the metallized layer is increased without flux.

The optical module 2 is manufactured in the following manner.

(Preparation Step P1)

First, a preparation step P1 is performed in the same manner as the first embodiment. However, when a semi-finished optical module to which the optical fiber is not connected is prepared, the bonding pad 31 is provided on the fiber mount 30. The bonding pad 31 may be formed by coating processing, such as an evaporation method, a sputtering method, or a plating method. Further, metallized layers are formed on a portion of the optical fiber 10 to be positioned on the bonding pad 31 and a portion of the optical fiber 10 to be positioned in the through hole 52 of the pipe part 51 when the subsequent disposition step P2 is performed. It is preferable that the metallized layer be formed by a plating method. The reason for this is that it is possible to form a metallized layer having a more uniform thickness on the side surface of the optical fiber 10 of which the shape of the side surface is a cylindrical shape, according to a plating method.

(Disposition Step P2)

Next, a disposition step P2 is performed. In this case, the optical fiber 10 is disposed so that the metallized layers of the optical fiber 10 formed in the preparation step P1 are positioned on the bonding pad 31 and in the through hole 52 of the pipe part 51, respectively.

(First Fixing Step P3)

Next, a first fixing step P3 is performed. In the first fixing step P3, first, a lump of solder 36 is disposed on the bonding pad 31 so as to be adjacent to the optical fiber 10. After that, the fiber mount 30 is irradiated with a laser beam so that the fiber mount 30 is heated. The solder 36 disposed on the bonding pad 31 is melted by the heat of the fiber mount 30, spreads on the entire bonding pad 31, and covers the metallized layer of the optical fiber 10. Further, the temperature of the fiber mount 30 is lowered by the stop of the irradiation of a laser beam, so that a part of the optical fiber 10 is fixed on the fiber mount 30.

(Second Fixing Step P4)

Next, a second fixing step P4 is performed. In the second fixing step P4, a lump of the solder 56 is disposed on the hole 53 of the pipe part 51. After that, the pipe part 51 is heated by high-frequency induction heating. Moreover, in this embodiment, the base 20 is simultaneously heated by the high-frequency induction heating. Further, when the temperature of the base 20 becomes the upper limit or higher of the guaranteed temperature of the optical module 2, tension F is applied to the optical fiber 10 in the same manner as the first embodiment. Furthermore, the solder 56 disposed on the hole 53 is melted by the high-frequency induction heating, so that the solder 56 is filled into the through hole 52 of the pipe part 51. After that, heating is stopped and the solder 56 is solidified, so that the optical fiber 10 is fixed to the pipe part 51.

The optical module 2 illustrated in FIG. 8 is obtained in this way.

Since the base 20 is heated by heat melting the solder 56 in the second fixing step P4 as in this embodiment, it is not necessary to heat the base 20 by other means. Accordingly, it is possible to simplify manufacturing steps.

Meanwhile, the second fixing step P4 has been performed by high-frequency induction heating in this embodiment, but the heating in the second fixing step P4 may be performed by resistance heating or laser beam. Further, the base 20 has been heated by heat melting the solder 56 in this embodiment, but the base 20 may be heated by a heater in the same manner as the first embodiment. Furthermore, heating may be performed by the combination of the heat of the base 20 and the heat melting the solder 56.

Moreover, in the first fixing step P3, the fiber mount 30 has been irradiated with a laser beam so that the solder 36 is melted by the heat of the fiber mount 30. However, even in the first fixing step P3, the solder 36 may be melted by resistance heating and the solder 36 may be melted by high-frequency induction heating.

Further, the tension F, which is applied to the optical fiber in the second fixing step P4, may be applied before heating.

Third Embodiment

Figure 9:
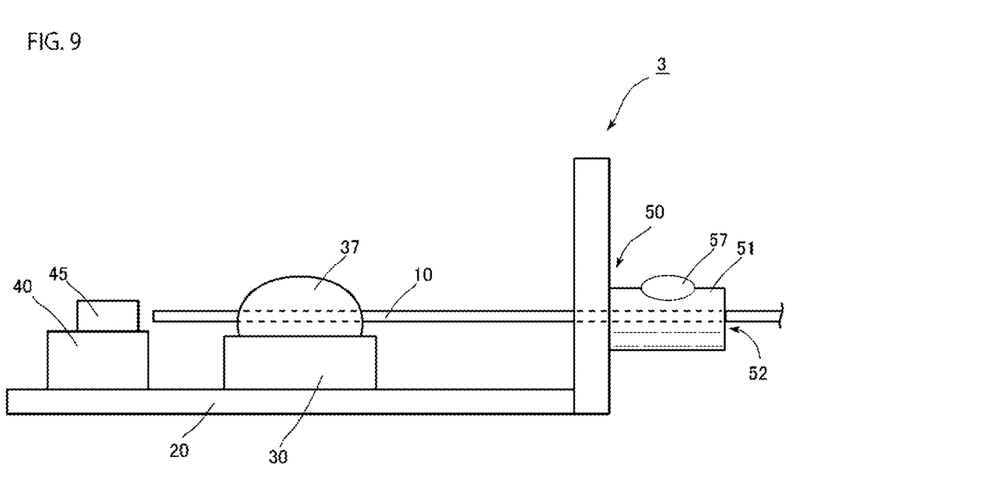
FIG. 9 is a diagram illustrating an optical module according to a third embodiment of the invention.

Next, a third embodiment of the invention will be described in detail with reference to FIG. 9. Meanwhile, the same components as the components of the first embodiment or components equivalent to the components of the first embodiment will be denoted by the same reference numerals except when being particularly described, and the repeated description thereof will be omitted. FIG. 9 is a plan view illustrating an optical module 3 according to a third embodiment of the invention.

As illustrated in FIG. 8, the optical module 3 of this embodiment is different from the optical module 1 of the first embodiment in that a part of an optical fiber 1 is fixed on a fiber mount 30 by a thermosetting resin 37 and the other part thereof is fixed in a through hole 52 of a pipe part 51 by a thermosetting resin 57.

The optical module 3 is manufactured in the following manner.

(Preparation Step P1 and Disposition Step P2)

First, a preparation step P1 is performed in the same manner as the first embodiment. Further, a disposition step P2 is performed in the same manner as the first embodiment.

(First Fixing Step P3)

Next, a part of an optical fiber 10 disposed on the fiber mount 30 is fixed on the fiber mount. Specifically, an uncured thermosetting resin is applied to connect the optical fiber 10 with the upper surface of the fiber mount 30 when the optical fiber 10 is disposed on the fiber mount 30 in the disposition step P2.

After that, the uncured thermosetting resin is heated by a heater so that the thermosetting resin is cured. In this way, a part of the optical fiber 10 is fixed to the fiber mount 30 by the thermosetting resin 37.

(Second Fixing Step P4)

Next, an uncured thermosetting resin is filled into a through hole 52 through a hole 53 formed in a pipe part 51, and the optical fiber 10 is covered with the thermosetting resin in the through hole 52. Further, the pipe part 51 is heated together with a base 20 by a heater, and tension F is applied to the optical fiber 10 in the same manner as the first embodiment when the temperature of the base 20 becomes the upper limit or higher of the guaranteed temperature of the optical module 3.

Meanwhile, when the base 20 is heated to an upper limit or higher of the guaranteed temperature of the optical module by heat that cures the thermosetting resin as in this embodiment, the curing temperature of the thermosetting resin 57 becomes a temperature that is higher than the upper limit of the guaranteed temperature of the optical module 3. Furthermore, since this tension needs to be applied before the uncured thermosetting resin is cured, it is preferable that tension be applied before heating.

The optical fiber 10 is fixed in the through hole 52 of the pipe part 51 by the thermosetting resin 57 that is cured in this way. Accordingly, the optical module illustrated in FIG. 9 is obtained.

Since the base 20 is heated by heat curing the uncured thermosetting resin in the second fixing step P4 as in this embodiment, it is not necessary to heat the base 20 by other means. Accordingly, it is possible to simplify manufacturing steps.

Meanwhile, the second fixing step P4 has been performed by a heater in this embodiment, but the thermosetting resin may be heated by other means. In addition, the base 20 may be heated using a heater that is separate from the heater curing the thermosetting resin.

Further, even in the first fixing step P3, the thermosetting resin may be cured by other means.

The first and second embodiments of the invention have been described above by way of example, but the invention is not limited to these embodiments.

In the above-mentioned embodiments, the optical module, which outputs a laser beam output from the semiconductor laser element by the optical fiber, has been described by way of example. However, the invention is not limited thereto, and a method of manufacturing an optical module in which an optical fiber is fixed to two fixing portions also may be applied to other optical modules. For example, the method also may be applied to an optical module such as a $LiNbO_3$ modulator in which an optical fiber is fixed to two fixing portions.

Further, the members, which fix the optical fiber 10 in the first fixing step P3 or the second fixing step P4, may be members that are separate from the members of the above-mentioned embodiments. For example, glass frit or a thermoplastic resin may be used as the members.

INDUSTRIAL APPLICABILITY

As described above, according to the invention, there is provided a method of manufacturing an optical module that has excellent reliability.

DESCRIPTION OF REFERENCE NUMERALS

1 . . . optical module
2 . . . optical module
3 . . . optical module
10 . . . optical fiber
11 . . . core
12 . . . clad
15 . . . metallized layer
20 . . . base
30 . . . fiber mount
31 . . . bonding pad
35 . . . ultraviolet curable resin
36 . . . solder
56 . . . solder
37 . . . thermosetting resin
40 . . . laser mount
45 . . . semiconductor laser element
50 . . . housing
51 . . . pipe part
52 . . . through hole
53 . . . hole
55 . . . ultraviolet curable resin
57 . . . thermosetting resin
61 . . . heater
P1 . . . preparation step
P2 . . . disposition step
P3 . . . first fixing step
P4 . . . second fixing step

The invention claimed is:

1. A method of manufacturing an optical module in which an optical fiber is fixed to two fixing portions, the method comprising:

a first fixing step of fixing a part of the optical fiber to one fixing portion; and a second fixing step of applying tension F by pulling the optical fiber while a base connected to the respective fixing portions has been heated to an upper limit or higher of guaranteed temperature of the optical module, and fixing the other part of the optical fiber to the other fixing portion, wherein when $t_{max}$ denotes the upper limit of the guaranteed temperature, $t_{base}$ denotes the temperature of the base heated in the second fixing step, $k_1$ denotes an equivalent linear coefficient of expansion of the base, $k_2$ denotes a linear coefficient of expansion of the optical fiber, A denotes the cross-sectional area of the optical fiber, E denotes the Young's modulus of the optical fiber, and F denotes the tension, $$0 < F < A \times E \times (k_1 - k_2) \times (t_{base} - t_{max})$$

is satisfied.

2. The method of manufacturing the optical module according to claim 1,
wherein the one fixing portion is a fiber mount and the other fixing portion is a part of a housing.

3. The method of manufacturing the optical module according to claim 2,
wherein the optical fiber is pulled in the second fixing step so that the tension is not applied to the optical fiber when the base is heated to a temperature higher than the upper limit of the guaranteed temperature and the temperature of the base becomes the same temperature as the upper limit of the guaranteed temperature.

4. The method of manufacturing the optical module according to claim 1,
wherein the optical fiber is pulled in the second fixing step so that the tension is not applied to the optical fiber when the base is heated to a temperature higher than the upper limit of the guaranteed temperature and the temperature of the base becomes the same temperature as the upper limit of the guaranteed temperature.

* * * * *